July 7, 1959     S. L. SUNDSTROM     2,893,756
PACKED COUPLING WITH DEFORMABLE RINGS FOR RELATIVE
ORIENTATION OF THE MEMBERS
Filed June 7, 1956

INVENTOR.
Savin L. Sundstrom
BY
Atty.

United States Patent Office 2,893,756
Patented July 7, 1959

2,893,756

PACKED COUPLING WITH DEFORMABLE RINGS FOR RELATIVE ORIENTATION OF THE MEMBERS

Savin L. Sundstrom, Chicago, Ill., assignor to The Bastian-Blessing Company, Chicago, Ill., a corporation of Illinois Application June 7, 1956, Serial No. 590,023

6 Claims. (Cl. 285—18)

This invention relates to an orientation lock ring for positioning a valve or other device in proper orientation on a tank or other body and more particularly to a device of the type indicated adapted to accomplish compression of a seal of the O-ring type at a predetermined constant pressure at the same time that orientation occurs.

Although various means have been provided for compressing an O-ring seal disposed between a valve fitting or other device and the body to which the valve is to be threadedly secured by straight threads, none of these devices provides compression of the soft seal and for the orientation of a fitting to a desired extent without a further load being imposed on the seal that very often results in either a destructive crushing or a poor seal.

Heretofore, either a metal-to-metal locking action has been utilized in which the engagement "goes solid" between between the fitting bodies to compress the seal, or orientation has been accomplished by means which do not impose the desired constant compression on the seal and yet secure the makeup against inadvertent loosening.

Accordingly, it is an object of the present invention to provide an orientation assembly, establishing constant compression on a soft seal as controlled by intermediate metal-to-metal crush engagement between the orientation parts that lock the fitting in a desired oriented position.

Another object of the invention is to provide an improved sealing assembly of the type indicated wherein an orientation ring and a cooperating washer are engaged in such a way as to provide a progressive crushing action between metal parts for over one thread turn to accomplish orientation without at the same time imposing further load on the seal.

Other objects and advantages will become apparent as the description proceeds in accordance with the drawings, in which.

Figure 1:
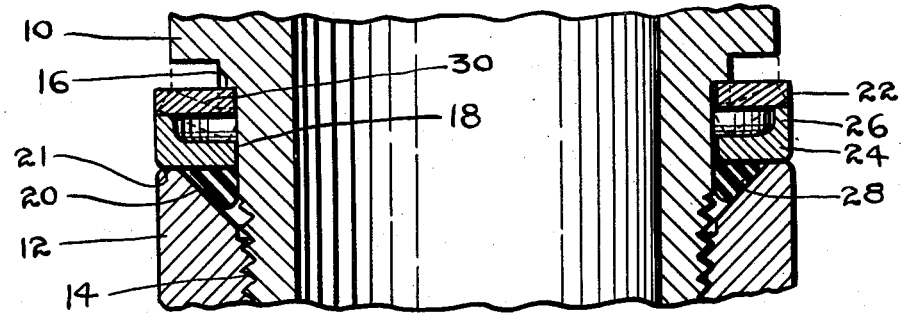
Fig. 1 is a vertical sectional view of the orientation assembly and means associated therewith of the invention, in fragmentary form.

Referring now to Fig. 1, a valve or other device is threadedly engaged in a body such as a tank flange or coupling 12 by means of straight threads 14. The valve may be of any unitary type, although other fittings which must be rotationally oriented in sealed relationship with respect to a supporting body to which they are to be secured may also utilize or be constructed in accordance with the essential concept of the invention.

The fitting 10 defines an annular shoulder 16 therearound a predetermined distance above the male-threaded portion 14 thereof, and a cylindrical wall 18 extending from the shoulder 16 to the male-threaded portion 14. The coupling 12 defines an inwardly chamfered wall 20 and an outer shoulder 21.

A washer ring 22 is received on the fitting 10 in abutting engagement with the annular shoulder 16, and a ring 24 having an upstanding annular flange 26 of diameter corresponding to ring 22 is disposed on the fitting below the washer 22 with the flange 26 engaging the washer 22. An O-ring 28 is supported against the wall 18 of the fitting 10 and on the chamfered wall 20 of the coupling 12 when the body 10 is threadedly received in the coupling as shown.

In order to provide for solid metal-to-metal contact between the washer ring 22 and the annular shoulder 16 and the ring 24 respectively, the ring 24 seats on the outer shoulder 21 so that angular rotation of the fitting 10 will cause the annular flange 26 of the ring to bear against the washer ring 22. This action also serves to compress the O-ring 28 as shown.

The start of the thread on the periphery of a valve body is not necessarily at the same point with respect to the connection openings of the body 10 and therefore orientation of the valve 10 must be accomplished to a fairly high degree of accuracy. The height of the shoulder or annular flange 26 is approximately the same as the lead of the thread for one turn and accordingly it is possible to accomplish the orientation within the tolerance of one turn of the valve body.

Thus, when the washer 22 is engaged by the shoulder 16, the valve may still be out of the desired relative position with respect to the coupling 12 and, accordingly, further rotation of the fitting 10 will cause the shoulder 16 under the lead of the thread to crush the inner edge of the washer 22 downwardly with the outer edge thereof still riding on the top of the annular flange 26. The limit of the crushing action and the position of the washer 22 afforded thereby is shown in dot-and-dash at 30, and will generally be accomplished when the inner edge of the washer engages the ring 24. The desired orientation may, however, be at some point between the initial engagement of the shoulder and the washer 22 and the washer in its crushed position 30. The action of the metal corner of shoulder 16 and flange 26 in crushing the washer will then lock the ring rotationally and will maintain the desired rotational position of the fitting thus achieved, in accordance with the predetermined thickness of rings 22 and 24.

The fitting 10 can be removed by turning it in the opposite direction of annular rotation and thereupon the washer 22 can be reversed or turned over and used again, in the manner described. The radial spacing of the flange 26 from the shoulder 16 thus makes it possible for the washer to be used a number of times, if desired.

Figure 2:
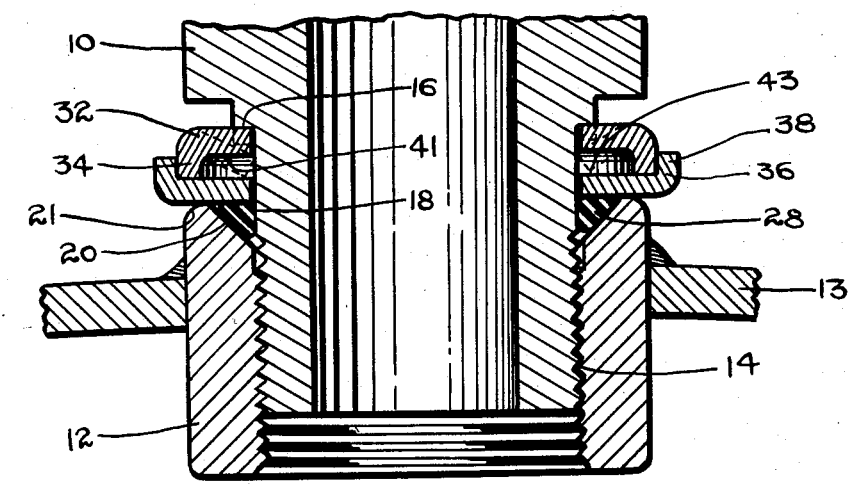
Fig. 2 is a vertical sectional view of a second embodiment of the invention.

A second embodiment of the invention is shown in Fig. 2, which also affords rotational adjustment of the fitting 10 with respect to the coupling 12 and a tank 13 in which the coupling is welded or otherwise secured. The construction of the fitting 10 and of the coupling 12 is as described with respect to Fig. 1. However, a ring 32 is provided for orientation purposes which has a depending flange 34, the upper surface of the ring being adapted to bear against the annular shoulder 16 of the fitting 10, and the annular flange 34 being adapted to bear against a ring 36 having an upstanding annular flange 38. An O-ring 28 as described in Fig. 1 is received between walls 18 and 20 of the fitting 10 and coupling 12 respectively, and when the fitting is turned a predetermined extent, the ring 32 is placed under compression force by shoulder 16 and the ring 36 as supported on shoulder 21 of the coupling 12.

Here again the accuracy of the orientation of the fitting 10 can be established to a high degree despite the fact that the thread of the fitting does not always come at the same point with respect to the connection openings of the body 10, and this is done by making the height of the flange below the surface 41 of the ring 32 correspond to slightly more than the longitudinal travel the fitting will make with each rotation. Thus when the ring 32 abuts the shoulder 16, the shoulder will crush it downwardly, as further force is applied by rotating the fitting 10 into the coupling 12. The ring 28 will again be compressed as soon as the ring 32 bears against shoulder 16 and the bottom wall 43 of the ring 36 bears against flange 34. However, the orientation of the ring will be completed by the time that the inner edge of ring 32 engages the surface 43. The flange 38 will hold ring 32 against buckling at its periphery and the effect of the metal-to-metal contact between the shoulder 16 and the ring 32, between the flange 34 and flange 38, between flange 34 and the wall 43 of ring 32 and ring 36, will serve to lock the fitting 10 securely in proper rotational position with respect to the coupling 12.

Figure 3:
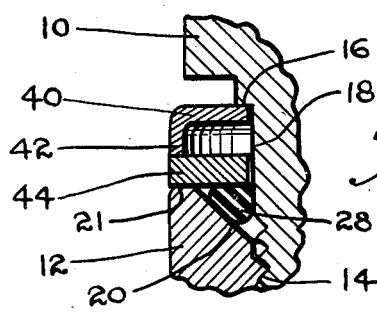
Fig. 3 is a fragmentary vertical sectional view of yet another embodiment of the invention.

Referring now to Fig. 3, a third and preferred embodiment of the invention is shown which corresponds generally to the embodiment of Fig. 2 but which differs in that the ring supported on the coupling 12 is of planar construction.

A ring 40 of hot rolled steel, preferably plated with cadmium, is provided with a depending flange 42 and disposed on the fitting 10 in abutting relation with the shoulder 16 thereof. A ring 44 is disposed on the fitting below the ring 40. When the fitting 10 is threadedly engaged in the coupling 12 as hereinbefore described, the annular flange 42 will first come into abutting engagement with the ring 44, the diameter of these respective elements being preferably substantially identical, with the ring 44 in supported relationship on the end of shelf 21 of the coupling 12. The pressure exerted on the sealing ring at such time will compress it into a substantially triangular cross-sectional configuration and effect good sealing relation between this element, the chamfered wall or shoulder 20 of the coupling and the cylindrical wall 18 of the fitting 10, the wall 20 having a depth and inclination complementary to the sealing ring 28 for this purpose.

Upon further rotation of the fitting 10 into the coupling 12, the ring 40 will be crushed downwardly at the portion thereof abutting the shoulder 16 and within the annular flange 42. In order to achieve this effect to the exact extent required to cause a locking engagement between the ring 40 and the shoulder 16, as well as the ring 44 where rotation is carried out to the maximum extent, the ring 40 has a relative thickness substantially less than that of ring 44. In one form of the device which has proven satisfactory, the ring 40 has a thickness of .0897 inch, while the support ring 44 is given a thickness of .1046 inch. Thus the thickness of the ring 40 will cause the fitting to become securely locked therewith at the precise position of angular rotation required for the predetermined alignment of openings which may be defined in the fitting. Also, the thickness of the ring 40 is sufficient to permit it to withstand the counter-stresses exerted by flange 42 and the sealing ring 28 respectively. It will be seen, however, that the downward force which is transmitted from shoulder 16 through ring 40 and its annular flange 42 is taken up by coupling 12 through its end or shelf 21.

There has thus been provided a device for orienting a fitting for valve openings or other elements in a predetermined angular position relative to the structure into which it is threadedly engaged. The height of the annular flange described in the several embodiments for spacing the planar portions of the respective rings is preferably such as to correspond to substantially the longitudinal travel the fitting will make with each rotation, which fitting is preferably straight for this purpose, so that variations in the position around the fitting at which the thread begins will not change the ultimate rotational locking position of the fitting in the coupling. The shoulder, for example, will dig into the ring slightly during rotation of the ring to its locking position to make the orientation more secure, it being understood that this locking position may be reached after one-fourth or one-half a turn of the fitting into the coupling. And because no complicated parts are required, the device may be readily manufactured with great economy, and may be assembled and disassembled without the need for exceptional skill.

Although I have herein set forth and described my invention with respect to certain details and principles, it will be understood by those skilled in the art that these may be varied without departing from the spirit and scope thereof, as defined in the hereunto appended claims.

I claim:

1. A coupling comprising male and female elements having mating straight threads and radially spaced annular shoulders of different diameters facing towards each other and disposed in parallel planes, the shoulder having the major diameter being on the female element, a pair of flat ring members between said shoulders to be engaged thereby and having aligned openings receiving said male element therethrough, one of said members having an axially directed upstanding portion between said members at the outer periphery thereof and disposed substantially in line with the shoulder having the major diameter, said portion spacing said flat ring members a distance substantially equal to the lead of one turn of said threads upon initial contact between said shoulders and ring members, the ring member engaging the shoulder of minor diameter having the strength of hot rolled steel or the like and being crushed towards the other ring member within the shear strength of said threads as measured in an axial direction for at least one additional turn of said threaded elements after said initial contact to provide rotational orientation of said elements in locked relationship, and sealing means between said elements engaged under compression by one of said ring members while said shoulders and ring members are in contact with one another.

2. A coupling device for a tank comprising a fitting and a coupling provided with male and female elements, respectively, having mating straight threads and radially spaced annular shoulders of different diameters facing towards each other and disposed in parallel planes, the shoulder on said coupling having the major diameter and being chamfered internally and said fitting having a smooth wall opposite said chamfer, a pair of flat ring members between said shoulders to be engaged thereby and having aligned openings receiving said male element therethrough, one of said members having an axially directed upstanding annular flange between said members disposed substantially in line with the chamfered shoulder, said flange spacing said flat ring members a distance substantially equal to the lead of one turn of said threads upon initial contact between said shoulders and ring members, the ring member engaging the shoulder of minor diameter having the strength of hot rolled steel or the like and being crushed towards the other ring member within the shear strength of said threads as measured in an axial direction for at least one additional turn of said threaded elements after said initial contact to provide rotational orientation of said fitting and coupling in locked relationship, and a sealing ring of an elastomer material disposed in said chamfer against said smooth wall and engaged under compression by one of said ring members while said shoulders and ring members are in contact with one another.

3. The combination called for in claim 1 in which the ring member engaged by said shoulder of major diameter has an annular upstanding flange telescoping over said upstanding portion on the other ring member.

4. The combination called for in claim 1 in which the male element has the shoulder of minor diameter thereon and a smooth wall portion between the male thread and said shoulder engaged by said sealing means.

5. The combination called for in claim 4 in which said sealing means is a ring-shaped gasket normally circular in cross-section and made of a resilient material.

6. The combination called for in claim 2 in which the said annular flange is provided on the ring member engaged by the shoulder of minor diameter, and the other ring member has an annular upstanding flange telescoping over said first named flange.

References Cited in the file of this patent

UNITED STATES PATENTS

| | | |
|---|---|---|
| 2,394,097 | Parker | Feb. 5, 1946 |
| 2,452,278 | Woodling | Oct. 26, 1948 |
| 2,476,561 | Pederson | July 19, 1949 |
| 2,533,059 | Shaffer | Dec. 5, 1950 |
| 2,793,059 | Woodling | May 21, 1957 |

FOREIGN PATENTS

| | | |
|---|---|---|
| 370,739 | Italy | Apr. 28, 1939 |
| 732,901 | France | June 27, 1932 |

OTHER REFERENCES

Parker O-ring Catalog No. 903, August 1950, Parker Appliance Co., 17,325 Euclid Ave., Cleveland 12, Ohio, pages 16 and 44.